United States Patent [19]
Aloisio, Jr. et al.

[11] Patent Number: 5,818,992
[45] Date of Patent: Oct. 6, 1998

[54] THERMO-PLASTIC OPTICAL TERMINATOR HAVING A GLASS-TRANSITION TEMPERATURE GREATER THAN 80° C.

[75] Inventors: Charles Joseph Aloisio, Jr., Atlanta; Wilton Wayt King, Chamblee; Norman Roger Lampert, Norcross; Daniel Lee Stephenson, Lilburn, all of Ga.

[73] Assignee: Lucent Technologies Inc., Murray Hill, N.J.

[21] Appl. No.: 810,004

[22] Filed: Mar. 3, 1997

[51] Int. Cl.$^6$ ........................................................ G02B 6/36
[52] U.S. Cl. .............................. 385/76; 385/139; 385/60
[58] Field of Search .............................. 385/76, 60, 139, 385/31, 39, 52, 53, 88, 89, 140

[56] References Cited

U.S. PATENT DOCUMENTS

| | | | |
|---|---|---|---|
| 4,186,999 | 2/1980 | Harwood et al. | 350/96.21 |
| 4,372,641 | 2/1983 | Johnson et al. | 350/96.12 |
| 4,998,795 | 3/1991 | Bowen et al. | 350/96.2 |
| 5,058,983 | 10/1991 | Corke et al. | 385/78 |
| 5,079,643 | 1/1992 | Horiuti et al. | 359/350 |
| 5,082,345 | 1/1992 | Cammons et al. | 385/60 |
| 5,263,103 | 11/1993 | Kosinski | 385/31 |
| 5,619,610 | 4/1997 | King et al. | 385/139 |

OTHER PUBLICATIONS

U.S. Application Serial No., 08/581,077 filed Dec. 29, 1995, W. W. King, et al. 3–9 now U.S. Pat. No. 5,619,610 Apr. 1997.

U.S. Application Serial No., 08/636,451 filed Apr. 23, 1996, N. R. Lampert, et al. 22–1 now U.S. Pat. No. 5,719,997 Feb. 17, 1998.

Thermal Characterization of Polymeric Materials, "Differential Thermal Analysis And Differential Scanning Calorimetry" 73–87 (Edith A. Turi ed., vol. 1, 1997).

Relaxation Phenomena In Polymers, "The Glassy State" 80–142, (Shiro Matsuoka ed., 1992).

*Primary Examiner*—Phan T. H. Palmer
*Attorney, Agent, or Firm*—Michael A. Morra

[57] ABSTRACT

An optical terminator 100 is designed to make end-to-end contact with an optical fiber whose end portion is held within a cylindrical ferrule. The optical terminator reduces reflections that occur when an optical path encounters an abrupt change in refractive index (e.g., when the end portion of the optical fiber encounters an air gap whose refractive index $n \approx 1.0$). The optical terminator includes a generally cylindrical member 110 that projects from, and is supported by, a backbone member 120. The cylindrical member and the backbone member are molded from polymethyl methacrylate (PMMA) as a one-piece structure. PMMA provides a reflection of about −40 dB. Nevertheless, plastic materials having an index of refraction of 1.46±0.06 produce reflections that are less than about −34 dB, which is acceptable in a large number of applications. Moreover, plastic materials having a glass-transition temperature ($T_g$) that is higher than about 80° C., exhibit minimum indentation creep under a compressive load at elevated temperatures. In one embodiment, the optical terminator 100 is spring loaded within a connector housing 45. In another embodiment, the spring 44 is eliminated and a connector housing is integrally molded with the optical terminator as a one-piece structure 70.

20 Claims, 5 Drawing Sheets

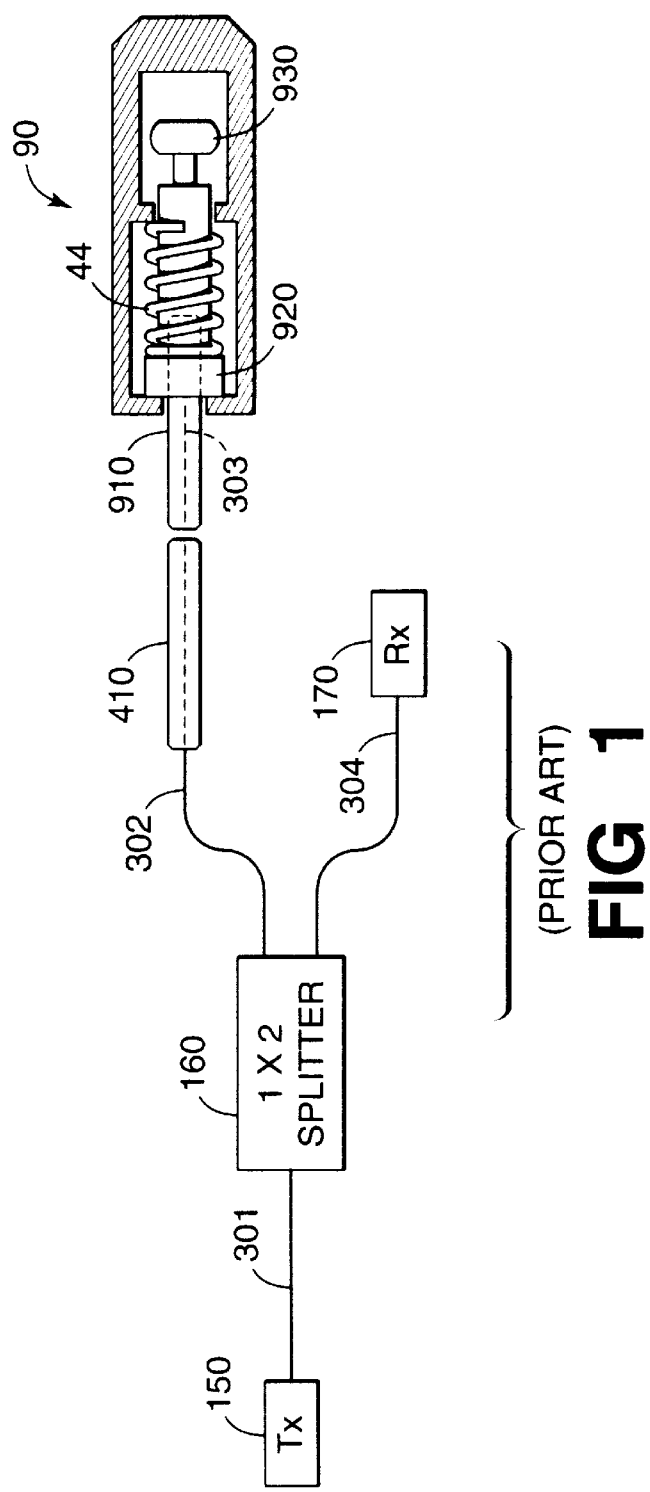
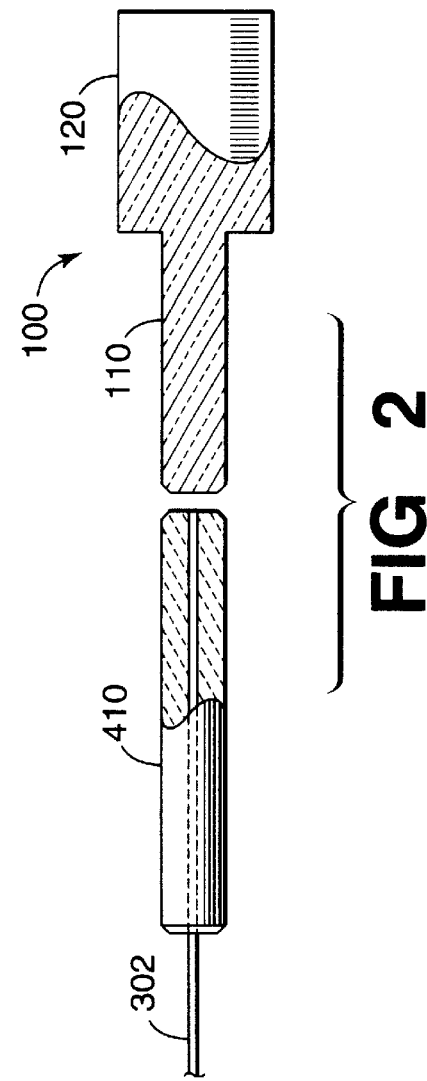

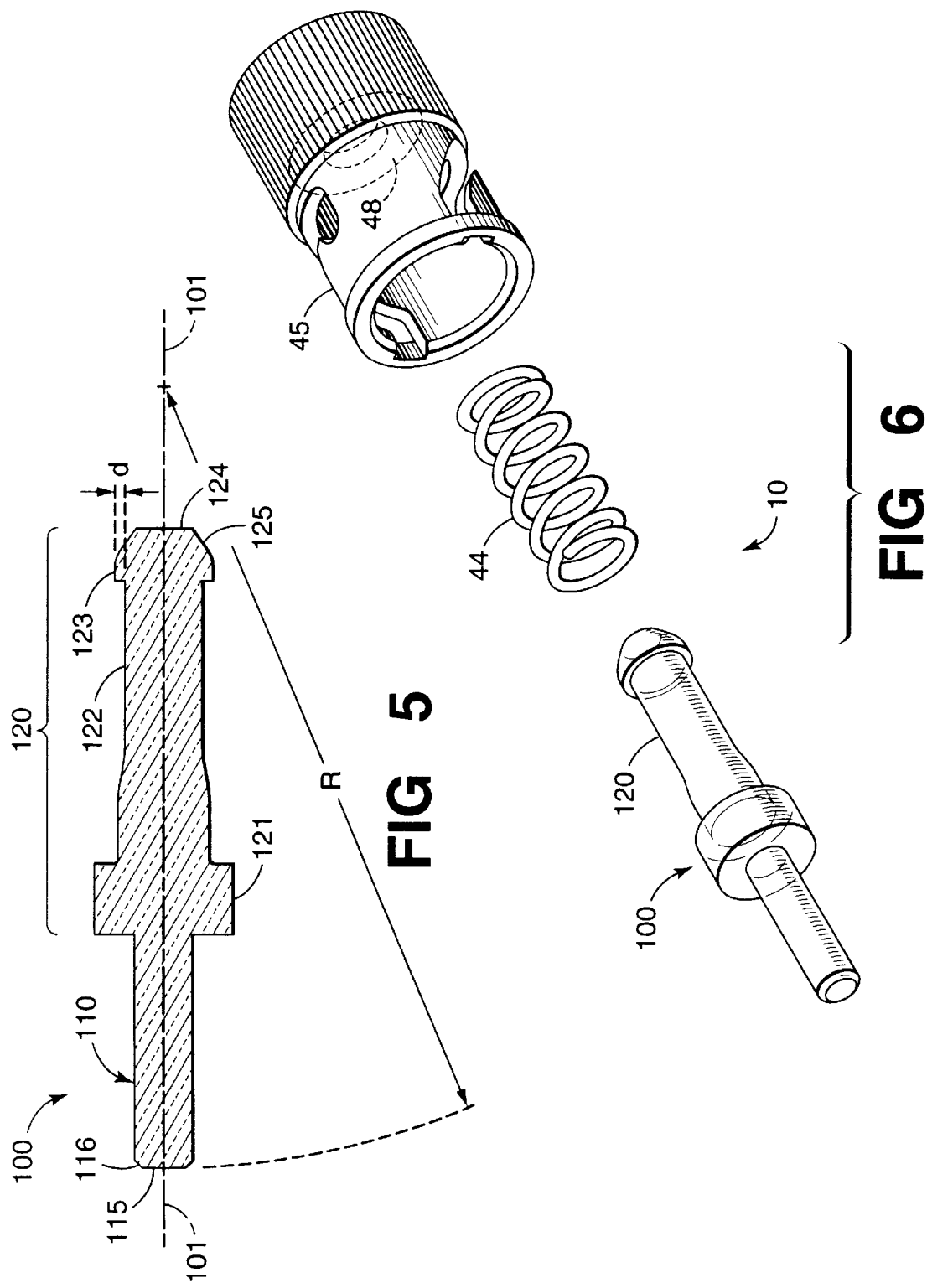

THERMO-PLASTIC OPTICAL TERMINATOR HAVING A GLASS-TRANSITION TEMPERATURE GREATER THAN 80° C.

TECHNICAL FIELD

This invention relates generally to optical communication devices, and more particularly to a termination for an optical fiber.

BACKGROUND OF THE INVENTION

Fiber-optic telecommunication networks often have branching elements. One example is a 1×N splitter having one input port and N output ports—many of which may be inactive, perhaps awaiting future expansion of the network. Optical reflectance will occur at the end of an inactive fiber, propagate back through the branching device, and thus cause distortions of signals passing through the active fibers. An optical terminator is an element which assures low reflectance at the termination of such an inactive optical path.

If the optical path in question is truncated in an angle-polished connector, the expected reflectance will be less than −60 dB, and this is sufficiently small that additional measures to further reduce reflectance usually are not needed. Should the termination be a cleaved fiber or a flat-polished connector abutting air, then the reflectance would be about −15 dB. The consequence of this for a 1×2 splitter, such as shown in FIG. 1, is that a signal is returned on the inactive fiber 302 whose power is 18 dB below power level of the input signal. In the most common construction of splitter, the fused-biconic taper, another drop of 3 dB occurs as the reflected signal passes back through the splitter. Thus, ignoring losses due to various imperfections, the reflected signal in the upstream path would be at −21 dB relative to the power of the input signal. This level is unacceptably high for many singlemode applications, and so a terminator is attached at the termination point, with reflectance usually specified to be less than −40 dB.

It is often desirable to truncate an incomplete branch of a fiber-optic network in a way that minimizes back reflections which would otherwise contaminate signals in the active branches. If the incomplete branch naturally ends in a single fiber connector engaged to an adapter (coupling), a connector-type terminator is used to suppress reflections; the terminator is simply plugged into the open end of the adapter. Because a polished optical fiber is embedded in the ferrule, the usual form of such a device is expensive.

U.S. Pat. No. 5,263,103 discloses an optical fiber terminator comprising a length of core-less, non-guiding (undoped or doped) silica fiber having substantially the same diameter as the fiber to be terminated (e.g., 125 μm). The amount of reflection varies according to the length and composition of the terminator, and by the use of non-reflecting coating applied to the optical fiber terminator. The optical fiber terminator is then attached to an active fiber by fusion splicing or index-matched epoxy. Unfortunately, handling such a small component is cumbersome, and conventional fusion splicers typically require that the fiber ends be relatively flat—meaning that this small component may need to be additionally processed prior to installation. Furthermore, in many applications, the optical fiber to be terminated is already installed in a standard optical connector, and it is undesirable to strip away the connector merely to access the optical fiber itself.

The last-mentioned difficulty is solved by another known terminator which comprises a length of fiber that is held within a cylindrical ferrule. The cylindrical ferrule includes an end face which abuts the optical fiber to be terminated. One end of the length of fiber terminates in the end face. It is cleaved perpendicular (e.g., 90°) to the central axis of the ferrule and then it is polished. The other end of the length of fiber is cleaved at an angle (e.g., 80°) with respect to the central axis. And while such a terminator provides good results, its manufacturing cost is far too high.

Because an optical terminator may be pressed against an optical fiber for long periods of time, it is desirable that the end face of the terminator resist deformation. After all, if the end face is deformed, then it cannot be re-used unless it is installed in the same orientation against the same optical fiber—otherwise an air gap will exist between the fiber and the terminator. This is normally not a problem when the terminator is made from a very hard material, such as ceramic, because the contact pressure between the terminator and the optical fiber is only about one (1) Kgf. However, if optical terminators are to made less expensively, then plastic materials, which are susceptible to deformation under pressure, need to be explored. Plastic materials change shape as a function of applied pressure, time, and temperature; and their susceptibility to deformation is related to their modulus (stiffness). The temperature at which the modulus begins to decrease sharply is known as its glass-transition temperature $(T_g)$. Accordingly, the higher the glass-transition temperature, the more resistant to deformation a material will be.

One optical terminator that is made from a plastic material is disclosed in U.S. Pat. No. 5,619,610. The power reflected by this terminator is at least 50 dB below the power level of the incident optical signal. The terminator comprises several component parts, one of which is a cylindrical ferrule that is made from a polymer material, preferably methylpentene copolymer, which is relatively expensive and which is quite susceptible to deformation under pressure—as evidenced by a glass-transition temperature of only about 25° C. This particular optical terminator provides superior performance, but may have to be discarded if it is ever removed. It has been determined that many applications do not require such high performance, and that it would be more desirable to have an optical terminator that is re-usable. Indeed, it is believed that a reflection that is less than about −34 dB would suffice. Accordingly, what is sought is an optical terminator that is less expensive than known optical terminators, and whose susceptibility to deformation under pressure is less than known optical terminators made from plastic.

SUMMARY OF THE INVENTION

An optical terminator is adapted to make end-to-end contact with an optical fiber. The optical terminator comprises a generally cylindrical member that projects from a backbone member. The cylindrical member and the backbone member are molded, as a one-piece structure, from a plastic material whose index of refraction is approximately equal to the index of refraction of the optical fiber being terminated. The plastic material has a glass-transition temperature, $T_g$, which is greater than about 80° C. thus providing a susceptibility to deformation under pressure that is less than that of known optical terminators made from plastic materials.

In illustrative embodiments of the invention, the optical terminator is disposed within a structure that facilitates mechanical interconnection with the optical fiber to be terminated. The refractive index of the optical terminator n=1.46±0.06, and it is molded from an acrylic polymer, such as a polymethyl methacrylate (PMMA), which is inexpensive and readily available from a number of suppliers.

In one embodiment of the invention, the optical terminator is disposed within a connector housing that includes a compressive spring member for thrusting the optical terminator against the optical fiber to be terminated. In another embodiment of the invention, the optical terminator and the connector housing are integrally molded from the same plastic material as a one-piece structure.

In all of the embodiments, the optical terminator substantially reduces the reflection over that which occurs when an optical fiber interfaces with air. Illustratively, the terminator made from PMMA provides a reflection that is about −40 dB, which is acceptable in many situations.

BRIEF DESCRIPTION OF THE DRAWING

The invention and its mode of operation will be more clearly understood from the following detailed description when read with the appended drawing in which:

FIG. 1 shows a lightwave system in which one optical fiber is terminated in a known terminating connector;

FIG. 2 discloses an optical fiber, which about to be terminated in an optical terminator according to the present invention;

FIG. 5 is a cross-section view of an optical terminator according to the present invention;

FIG. 6 is an exploded perspective view of a first embodiment of a terminating connector according to the present invention;

DETAILED DESCRIPTION

Figure 3:
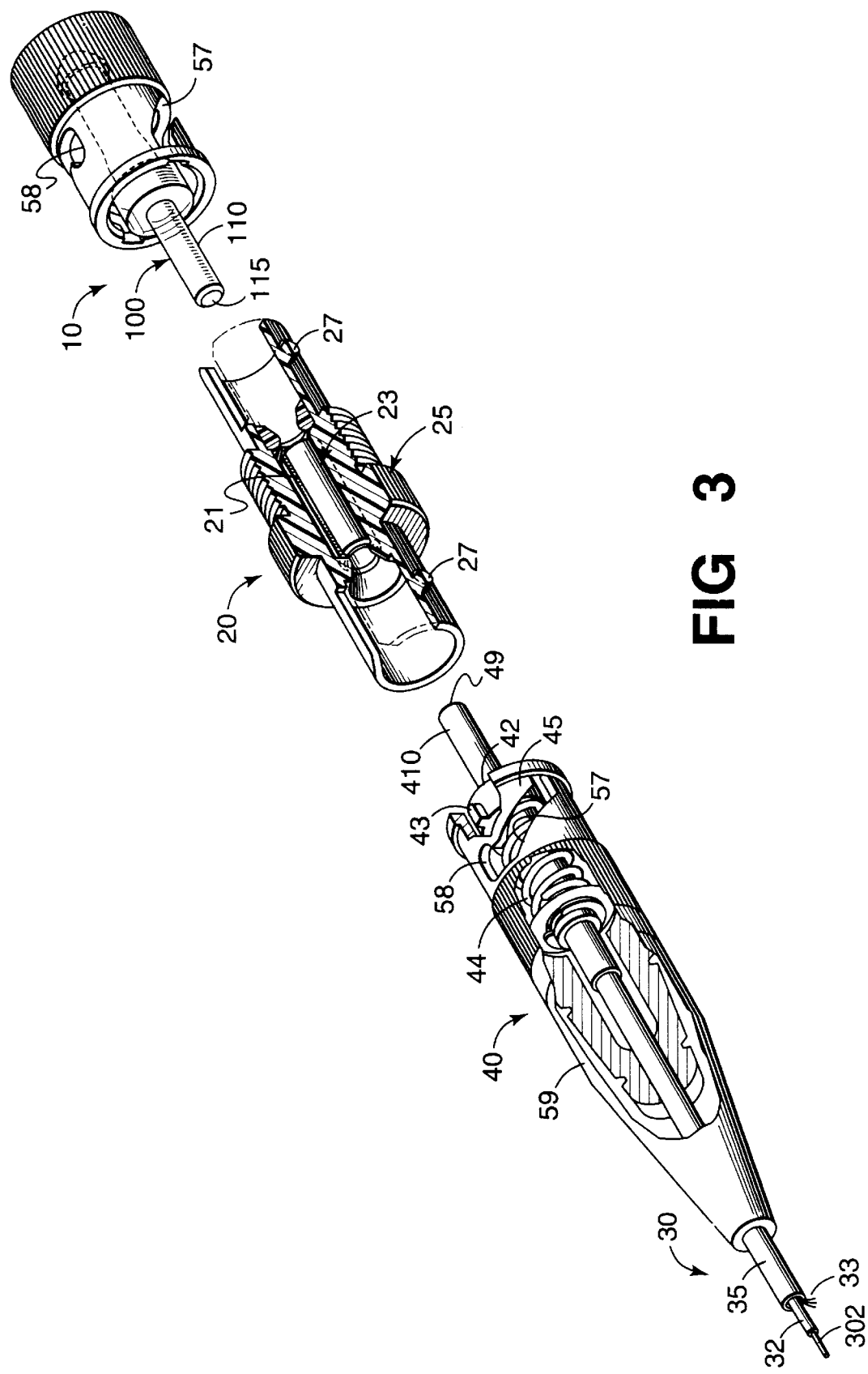
FIG. 3 is an exploded perspective view of an optical fiber termination system.

Reference is made to FIG. 1 which discloses the prior art situation discussed in the Background of the Invention. In particular, transmitter 150 generates lightwave signals for transmission over optical fiber 301 for a predetermined distance. Power splitter 160 distributes the optical input signal, which is present on fiber 301, into two output channels that are connected to optical fibers 302, 304. Optical fiber 304 is shown terminating in a receiver 170, and for the purpose of discussion, this termination is perfect (i.e., no portion of the optical signal that enters the receiver is reflected back toward power splitter 160). However, unless optical fiber 302 is properly terminated, there will be reflections.

Signal reflections present a serious problem in high capacity optical fiber systems since the reflected power can interfere with the proper operation of singlemode lasers; and reflectance is a function of the material index of refraction and the index difference of the interfaces as given by the following equation:

$$\text{Reflectance} = -10 \log [(n_0-n_i)^2/(n_0+n_i)^2]$$

For example, in a glass-to-air interface ($n_0 \approx 1.0$ for air, and $n_1 \approx 1.46$ for glass) the reflectance is 14.6 dB. For two materials with only slight differences in $n_i$ (e.g., $n_1$=1.47 vs. 1.46), the reflectance is −49.3 dB.

Applying this information to FIG. 1, optical fiber 302 is held within a ferrule 410, which is made from ceramic or glass and whose end face is highly polished. Unless a device such as terminating connector 90 is present, there will be a glass-to-air interface and, consequently, an undesirable reflection. Terminating connector 90 comprises a cylindrical ceramic ferrule 910 which is held by backbone structure 920 that is made from metal. An optical fiber 303 is shown extending along the central axis of the ferrule 910. A spring 44 is used to provide compressive thrust between ferrules 410 and 910 so that the two fibers 302, 303 will be in intimate contact. A low-reflectance termination can be formed by truncating the fiber 303 in a number of different ways. In particular, the fiber can be cleaved at an appropriate angle (e.g., 80°) with respect to the central axis or simply crushed. Alternatively, a low reflectance material 930 can be applied to the end of fiber 303 (see, for example, U. S. Pat. No. 5,079,643), or fiber 303 can be a high loss fiber.

The present invention avoids these relatively expensive techniques by constructing a terminator in the manner shown by FIG. 2. Specifically, optical terminator 100 comprises a ferrule member 110 and a backbone member 120 which are integrally molded as a single piece from a plastic material whose index of refraction is about 1.46±0.06, and whose glass transition temperature $T_g$ is greater than 80° C. And while backbone member 120 is illustratively shown as a cylindrical solid in FIG. 2, it may have any suitable shape. Various preferred shapes are shown in greater detail in FIGS. 5–8.

Figure 4:
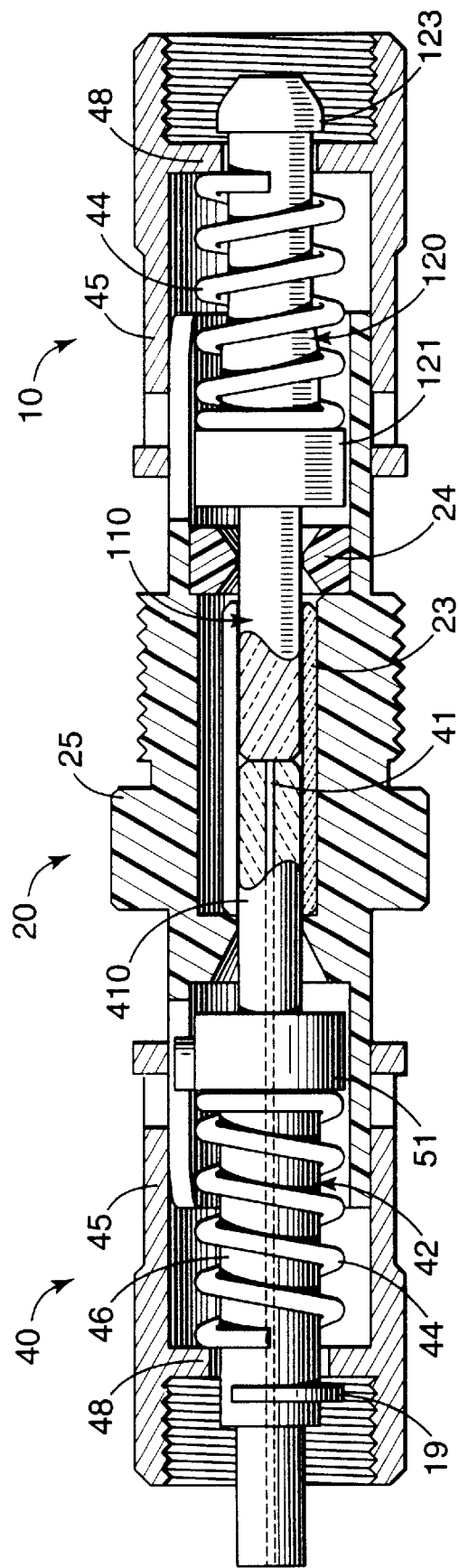
FIG. 4 is an elevation view of the optical fiber termination system of FIG. 3 shown interconnected and in partial cross section.

Referring now to FIG. 3 and 4, an optical fiber terminating system having low reflectance is shown. Since the terminating system is best illustrated using known optical connectors, a brief discussion of optical connector design is given. In particular, the ST® lightguide cable connector 40 is discussed —ST being a registered trademark of Lucent Technologies Inc. It is understood that the ST connector is only used for the purpose of illustration, and that the present invention may be included in a number devices that facilitate mechanical interconnection in a fiber terminating system.

Optical fiber 302 includes a core and a cladding surrounded by one or more layers of an acrylate coating material for protection. Additionally, the optical fiber may be surrounded by a layer of polyvinyl chloride (PVC) to provide what is referred to as a buffered fiber 32. Further, a sheath system is shown, illustratively comprising strength members 33 made from aramid fibrous material and an outer jacket 35 made from PVC. Together, these elements form an optical cable 30 which has excellent transmission and handling characteristics, but which cannot be joined to other optical equipment without a connecting arrangement. For that purpose, an optical connector 40 is needed.

An end member of optical fiber 302 terminates in a plug 410 which is interchangeably referred to as a ferrule. Plug 410 is generally cylindrical and has an axial passageway 41 (see FIG. 2) that extends from one end to the other, and is made from a ceramic material such as zirconia. Plug 410 has an outer diameter of about 2.5 millimeters (mm), although a new generation of miniature plugs is now available having an outer diameter of 1.25 mm. An end face 49 of the plug 410 includes an opening into passageway 41.

It is necessary to prepare fiber 302 for attachment to optical connector 40. Accordingly, the acrylate coating, the buffer layer 32, the strength members 33, and the outer jacket 35 are removed from an end member of optical fiber 302. The uncoated end member of the optical fiber 302 is then inserted and secured within the passageway 41 of plug 410, and the end face of the optical fiber is cleaved and polished. Connector 40 also includes a metallic structure (backbone) 42 for holding the ferrule, a compression spring 44 and a tubular connector housing 45 made of a plastic or a metallic material. It should be observed that the plug, backbone, and connector housing each have a cylindrical cross section. The backbone 42 includes a separate orienting or alignment key 43, which projects radially outward.

The backbone 42 includes a small diameter member 46 (see FIG. 4) which extends through an opening in an internally disposed collar 48 in the connector housing 45. A retaining washer 19 circumscribes the small diameter member on the outer side of the collar. The spring 44 disposed about the smaller diameter member 46 of the backbone 42 between the collar and the large diameter member 51. As a result of this arrangement, the spring 44 biases the backbone 42 outwardly from the cable to hold the connector body within the connector housing 45. It can be seen that the connector housing 45 includes a latching structure comprising a slot 57 and a pin-holding region 58 at the end of the slot. The slot 57 and pin-holding region 58 are used for securing connector 40 to a mating device such as coupling apparatus 20.

Completing the connector 40, there is shown a member 59 which may extend from the connector housing 45 along the optical cable in a conically shaped configuration. This member of the connector 40 provides strain relief for the connector and ensures that the cable can withstand repeated bends in use after interconnection with another cable without undue stresses being imparted to the optical fibers.

The optical fiber terminating system further includes a coupling apparatus 20 comprising a housing 25 and an alignment sleeve 23. The alignment sleeve has a longitudinal slot 21 which accommodates ferrules having slightly different diameters. The sleeve 23 is disposed within the housing 25 and maintained therein by a retainer 24. A pair of diametrically opposed, radially extending pins 27—27 are disposed at each end of housing 25 for securely joining a pair of connectors 10, 40.

The optical fiber terminating system finally includes a terminating connector 10 having optical terminator 100 installed therein. Because optical terminator 100 includes a ferrule member 110 having the same general shape and size as plug 410, it is readily makes end-to-end contact therewith using a known connector structure and a known coupling apparatus. It will be observed that connectors 10 and 40 are substantially similar. For example, each connector includes an identical connector housing 45 having a latching structure comprising a slot 57 and a pin-holding region 58 at the end of the slot. When the connectors 10, 40 are inserted into the coupling apparatus 20, the latching pins 27—27 enter and move along slots 57—57. At the end of travel, each pin 27 is captured in the pin-holding region 58 of slot 57. As shown in FIG. 4, the backbone member 120 of terminator 100 includes an enlarged region 124 at one end thereof. Its diameter is slightly larger (0.25 mm) than the diameter of an internal flange 48 within connector 10 and, therefore, avoids the need for a retaining washer 19 such as used within connector 40. Compression spring 44 wraps around the backbone 120, pressing against the internal flange 48 on connector housing 45 and against flange 121 on the backbone 120 to thrust ferrule 110 into intimate contact with ferrule 410. Whereas each of the connectors 10, 40 includes a compression spring, only one is required to limit the force needed to assure contact. Accordingly, terminating connector 10 can be constructed without a spring for even lower cost.

Reference in now made to FIG. 5 which discloses optical terminator 100 in greater detail. Optical terminator 100 is a generally cylindrical structure and has a longitudinal axis 101 which extends from its proximal end face 115 to its distal end face 124. It is molded as a unitary structure from a plastic material into a shape that includes a ferrule member 110 that projects from a backbone member 120. The ferrule member resembles a conventional ferrule so that it can be installed in a conventional connector and used with existing hardware to terminate unused fibers. Conventional connectors utilize ferrules having a diameter of about 2.5 mm; although a new generation of miniature connectors is becoming available with ferrules having a diameter of about 1.25 mm. The present invention specifically contemplates these particular diameters as well as others. So that the ferrule member 110 can be easily inserted into existing hardware, end face 115 includes a bevel 116. Moreover, end face 115 is convex, having the shape of a highly polished (0.0001 mm) dome whose radius R is preferably within the region: 30 mm<R<5 mm. A dome is used to assure that end face 115 makes contact with optical fiber 302, which is centrally positioned on end face 49 of ferrule 410 (see FIG. 3).

So that the backbone member 120 of the optical terminator 100 can be easily inserted into the internal flange 48 of connector 10, as discussed above, its end face 124 includes a bevel 125 that allows it to be pressed through the opening circumscribed by flange 48. Moreover, the backbone 120 itself includes a small flange 123 around its outside so that after the end face 124 is pressed through the opening, it will be captured. Because the terminator is made from plastic, and because the flange 123 only extends a small distance "d" beyond the body 122 of the backbone 120, an interference fit is possible. Preferably, d is approximately equal to 0.13 mm.

FIG. 6 discloses an exploded perspective view of a first embodiment of a terminating connector 10 in accordance with the invention. Connector 10 comprises an optical terminator 100, a compression spring 44 and a tubular connector housing 45. After the spring 44 is placed on the backbone member 120 of the optical terminator, the terminator is pressed into the opening circumscribed by internal flange 48 within the connector housing. Spring 44 biases the optical terminator 100 toward the left hand side of FIG. 6 so that it can make end-to-end contact with an optical fiber. The spring not only functions to eliminate any air gap between the terminator and the optical fiber, but also to limit contact force to an amount (illustratively 1 Kgf) that will not deform the end face of the optical terminator. Alternatively, the terminating connector 10 can be constructed without a spring. In this situation, spring 44 within optical connector 40 (see FIG. 3) biases ferrule 410 toward the optical terminator 100. Moreover, once the spring that is associated with the optical terminator is discarded, the entire terminating connector 10 (i.e., connector housing 45 and terminator 100) is molded as a one-piece structure. In this situation, the latching structure (i.e., slot 57 and pin-holding region 58) is now an integral part of the backbone member 120.

Figure 7:
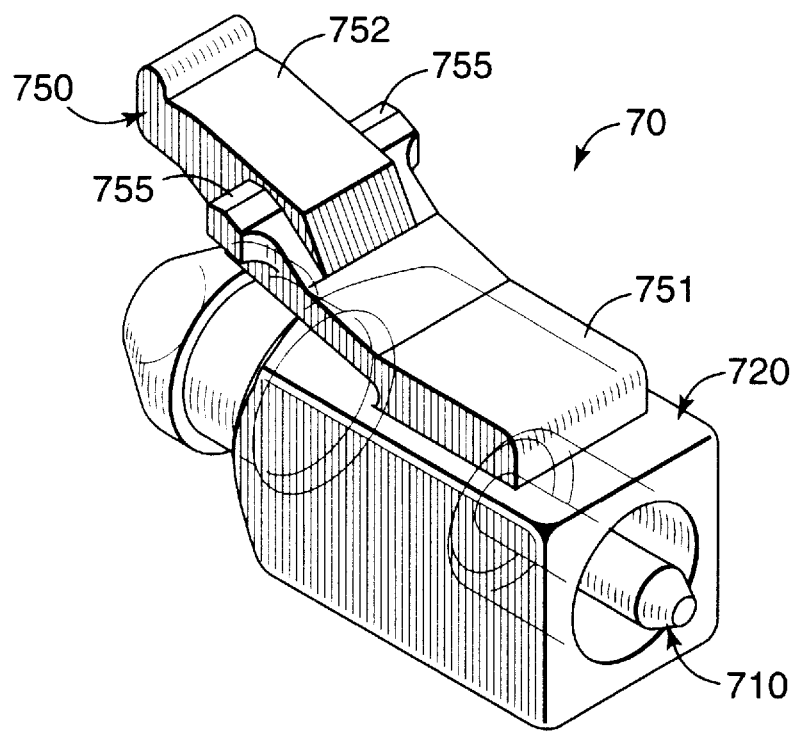
FIG. 7 is a perspective view of a second embodiment of a terminating connector according to the present invention.

FIG. 7 is a perspective view of a second embodiment of a terminating connector 70 in accordance with the invention. This particular embodiment is suitable for use with optical connecting apparatus such as shown in U.S. Pat. No. 5,719, 977. Terminating connector 70 comprises a cylindrical member 710 that projects from a backbone member 720. The backbone member includes a latching structure 750, which is used for securing the connector 70 to an associated receptacle. The latching structure comprises a cantilever having a fixed end 751, and a free end 752 that deflects downward upon insertion into the associated receptacle. And when the connector 70 is fully within the receptacle, the free end 752 returns upward toward its rest position owing to its restorative force. A pair of shoulders 755—755 on the latching structure are used to lock the connector 70 within the receptacle. Cylindrical member 710 illustratively has an outer diameter of about 1.25 mm and a length of about 7.0 mm. Terminating connector 70 has a footprint (cross-section dimensions) of about 4.6 mm by 4.6 mm.

Figure 8:
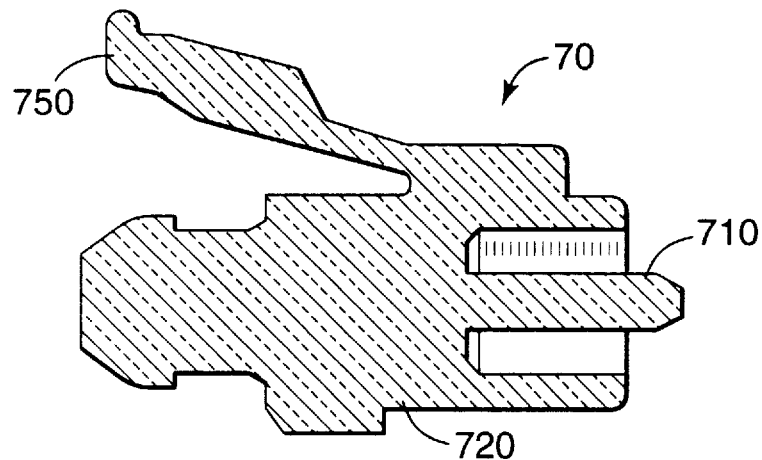
FIG. 8 is a cross-section view of the terminating connector of FIG. 7.

FIG. 8 shows a cross-section view of the terminating connector 70 of FIG. 7. As indicated, the connector 70 is a one-piece unit. It is molded from a plastic material whose glass-transition temperature, $T_g$, is greater than 80° C. And while a number of different plastic materials may be used, polymethyl methacrylate is preferred as discussed below.

Material Selection

Although various plastic materials can be used in the practice of the present invention, those having the following properties are preferred:

1. Refractive index that provides a reflectance of no more than about −34 dB for normal incident light at wavelengths commensurate with fiber optic transmission (e.g. 1200–1600 nanometers). The objective is to approximately match the refractive index of the terminator to that of a polished fiber end. According to the equation for reflectance set forth hereinabove, the corresponding range of refractive indexes would be: 1.40<n<1.52.
2. The plastic material will be under a compressive load of about 1 Kgf that is applied through spring-loaded contact by the opposing ferrule which contains an optical fiber. Deformation of the plastic by this compressive force will result in indentation of the plastic terminator. This deformation may subsequently compromise the performance of the terminator as manifested by an increased reflection following demating/mating of the optical interconnect. Accordingly, the glass-transition temperature of the plastic should be greater than about 80° C.
3. Injection moldable in order to facilitate low-cost manufacturing and to optimize design flexibility.

There are only a limited number of polymeric materials that meet these criteria. Many of these materials are acrylics which possess glass transition temperatures ($T_g$) well below 80° C., or are opaque at the near infrared (IR) wavelengths characteristic of fiber optic transmission, (e.g., polyethylene and polypropylene). The low glass-transition temperature of acrylics can be modified upon blending with other compounds such as polyimide (e.g., Kamax™, ELF Atochem) or PVDF (Kynar™, ELF Atochem). However, these blends typically exhibit an unacceptably high refractive index. Other polymeric blends or copolymeric materials can also be used. Moreover, the creep behavior of polymers can be favorable affected through processing or post processing thermal or mechanical treatment. For example, if the polymer creeps 5 microns in one (1) hour prior to treatment, exposure to temperature 10–20 degrees below the glass-transition temperature for one (1) hour could reduce the creep such that 5 microns would occur in ten (10) hours. A related discussion can be found in *Relaxation Phenomena in Polymers*, edited by Shiro Matsuoka, © 1992, Hanser Publishers, particularly chapter 3 entitled: *The Glassy State*. Measurements of glass-transition temperature can be made using differential scanning calorimetry (DSC) or direct creep measurements after treatment. See, for example, pages 73–78, *Thermal Characterization of Polymeric Materials*, Second Edition Vol. 1, edited by Edith A. Turi and is hereby incorporated by reference.

A commercially available plastic material which meets the combined requirements set forth above is polymethyl methacrylate (PMMA), which is manufactured under a number of tradenames including Plexiglas® by AtoHaas North America Inc., and Lucite® by ICI Acrylics Inc. PMMA is a thermoplastic polymer derived from methly methacrylate and has excellent optical properties. The glass transition temperature $T_g$ of PMMA is about 109° C. which provides excellent resistance against creep for a plastic material. The index of refraction of PMMA is about 1.49 which provides a reflectance of about −40 dB which is suitable for most applications.

Although various particular embodiments have been shown and described, it is understood that modifications are possible within the spirit and scope of the invention. These modifications include, but are not limited to, the use of polymers other than PMMA in the construction of the optical terminator; installation of the optical terminator in apparatus other than what are known as connectors. Additionally, it is understood that the refractive index of the optical terminator can be selected to match the refractive index of a plastic fiber rather than glass.

What is claimed is:

1. A terminator for terminating an optical fiber comprising a generally cylindrical member that projects from a backbone member, the cylindrical member and the backbone member being molded from a thermoplastic material as a one-piece structure, the thermoplastic material having a refractive index that is approximately equal to the refractive index of the optical fiber to be terminated, the thermoplastic material having a glass-transition temperature that is greater than about 80° C.

2. The terminator of claim 1 wherein the cylindrical member includes an end face for interfacing with the optical fiber to be terminated, said end face being convex.

3. The terminator of claim 2 wherein the convex end face has a radius R, which is less than about 50 millimeters.

4. The terminator of claim 1 further comprising a connector housing that surrounds the backbone member and holds the backbone member therein, said connector housing having a latching structure for attachment to a receptacle.

5. The terminator of claim 4 further comprising a compression spring that surrounds the backbone member and thrusts it toward an opening in the connector housing.

6. The terminator of claim 1, wherein the thermoplastic material comprises polymethyl methacrylate.

7. The terminator of claim 1 wherein the thermoplastic material has an index of refraction of 1.46±0.06 within the wavelength region 1200–1600 nanometers.

8. The terminator of claim 1 wherein the cylindrical member and the backbone member are formed by injection molding.

9. The terminator of claim 1 wherein the backbone member includes a latching structure for securing the terminator to a receptacle; whereby a terminating connector is formed.

10. A one-piece optical terminator, molded from thermoplastic material having a refractive index n=1.46±0.06 at optical wavelengths between 1200 and 1600 nanometers, said terminator comprising a generally cylindrical member that projects from a backbone member, the thermoplastic material having a glass-transition temperature which is greater than 80° C.

11. The terminator of claim 10 wherein the backbone member includes a latching structure for securing the terminator to a receptacle.

12. The terminator of claim 11 wherein the latching structure comprises a cantilever having a fixed end and free end that deflects downward upon insertion into the receptacle.

13. The terminator of claim 10 wherein the thermoplastic material comprises polymethyl methacrylate.

14. An optical fiber termination system including:

an optical cable terminated in a connector, the cable comprising an optical fiber which is surrounded by a protective sheath system and the connector including a cylindrical plug having an axial passageway that extends from one end face thereof to the other, said optical fiber residing in the axial passageway and terminating in one end face of the plug;

a one-piece optical terminator comprising a cylindrical member that projects from a backbone member, the cylindrical member having a diameter that is approximately equal to the diameter of the plug, said terminator being molded from a thermoplastic material having a refractive index that is approximately equal to the refractive index of the optical fiber and a glass-transition temperature that is greater than 80° C.; and coupling apparatus having a cylindrical slot through a wall thereof, said slot being sized to receive the plug in one end thereof and the optical terminator in the other end.

15. The terminator of claim 14 wherein the thermoplastic material comprises polymethyl methacrylate.

16. A terminating connector for terminating an optical fiber disposed within a cylindrical ferrule, said terminating connector comprising:

(a) an optical terminator comprising a cylindrical member that projects from a backbone member, the backbone member having a flange that extends at least partially around its outside surface, the cylindrical member and the backbone member being molded from thermoplastic material as a one-piece unit, the thermoplastic material having a glass-transition temperature that is greater than 80° C.;

(c) a connector housing enclosing the backbone member and having an internally disposed surface that is perpendicular to the longitudinal axis of the plug; and (d) a compression spring surrounding the backbone member, one end of the spring pressing against its flange and the other end of the spring pressing against the internally disposed surface of the connector housing.

17. The terminating connector of claim 16 wherein the thermoplastic material comprises polymethyl methacrylate.

18. A terminating connector for an optical fiber, said connector comprising a generally cylindrical member that projects from a backbone member that includes a latching structure for securing the connector to a receptacle, the cylindrical member and the backbone member being molded from a thermoplastic material as a one-piece unit, the thermoplastic material having a refractive index that is approximately equal to the refractive index of the optical fiber to be terminated, the thermoplastic material having a glass-transition temperature that is greater than 80° C.

19. The terminating connector of claim 18 wherein the latching structure comprises a cantilever having a locking means positioned between a free end and a fixed end of the cantilever.

20. The terminating connector of claim 18 wherein the thermoplastic material comprises polymethyl methacrylate.

* * * * *